United States Patent
Fujishiro et al.

(10) Patent No.: US 11,496,951 B2
(45) Date of Patent: Nov. 8, 2022

(54) MOBILE COMMUNICATION SYSTEM AND RADIO TERMINAL

(71) Applicant: KYOCERA Corporation, Kyoto (JP)

(72) Inventors: Masato Fujishiro, Yokohama (JP); Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 82 days.

(21) Appl. No.: 16/952,172

(22) Filed: Nov. 19, 2020

(65) Prior Publication Data

US 2021/0076311 A1  Mar. 11, 2021

Related U.S. Application Data

(63) Continuation of application No. PCT/JP2019/020594, filed on May 24, 2019.

(60) Provisional application No. 62/677,296, filed on May 29, 2018.

(51) Int. Cl.
*H04W 48/16* (2009.01)
*H04W 16/18* (2009.01)

(52) U.S. Cl.
CPC ........... *H04W 48/16* (2013.01); *H04W 16/18* (2013.01)

(58) Field of Classification Search
CPC ........ H04N 5/357; H04N 5/374; H04N 5/378; H04N 5/3658; H04N 5/3577; H04W 48/16; H04W 16/18; H04W 84/047; H04W 76/40; H04W 4/06; H04W 16/26; Y02D 30/70

See application file for complete search history.

(56) References Cited

U.S. PATENT DOCUMENTS

| | | | |
|---|---|---|---|
| 2020/0037398 A1 | 1/2020 | Adachi et al. | |
| 2021/0014757 A1* | 1/2021 | Fujishiro | H04W 36/08 |
| 2021/0329535 A1* | 10/2021 | Chou | H04W 48/04 |
| 2021/0360710 A1* | 11/2021 | Höglund | H04W 24/10 |

FOREIGN PATENT DOCUMENTS

WO   2018/061759 A1   4/2018

* cited by examiner

*Primary Examiner* — Diane D Mizrahi
(74) *Attorney, Agent, or Firm* — Studebaker & Brackett PC

(57) ABSTRACT

A mobile communication system comprises a radio base station configured to manage a cell having a first coverage and a second coverage which is a portion enhanced more than the first coverage; a radio relay node configured to receive, from the radio base station, a plurality of data having different destination radio terminals from each other, and transmit the plurality of data simultaneously to a plurality of radio terminals in the second coverage; and a radio terminal configured to be located in the second coverage, receive one or a plurality of control signals transmitted from the radio base station or the radio relay node. The radio terminal is configured to perform a process of receiving data addressed to own radio terminal from the radio relay node based on the one or the plurality of control signals.

13 Claims, 6 Drawing Sheets

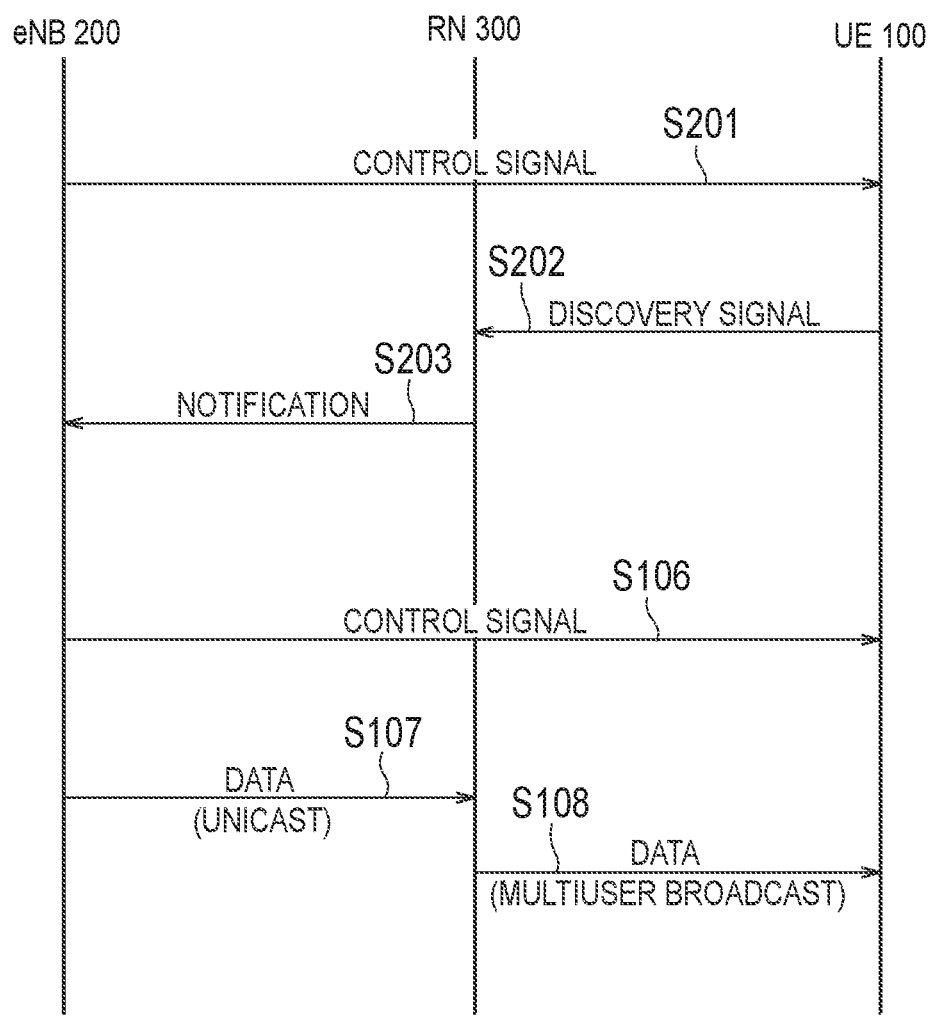

MOBILE COMMUNICATION SYSTEM AND RADIO TERMINAL

RELATED APPLICATIONS

The present application is a continuation based on PCT Application No. PCT/JP2019/020594, filed on May 24, 2019, which claims the benefit of U.S. Provisional Application No. 62/677,296 (filed on May 29, 2018). The content of which is incorporated by reference herein in their entirety.

TECHNICAL FIELD

The present invention relates to a mobile communication system and a radio terminal.

BACKGROUND ART

In recent years, radio terminals targeting machine type communication (MTC) and Internet of Things (IoT) services that perform communication without human intervention have attracted attention. Such a radio terminal is required to realize cost reduction, coverage expansion, and low power consumption.

For this reason, in 3rd generation partnership project (3GPP), a category of a new radio terminal whose transmission/reception bandwidth is limited to only a part of the system transmission/reception bandwidth is specified. An enhanced coverage function including repetition etc. is applied to the radio terminal.

An enhanced coverage which is a portion enhanced by the enhanced coverage function is a region where received signal power of downlink is exceptionally low as compared with a normal coverage. Therefore, it is desired to realize a technique for improving reachability of data to a radio terminal located within the enhanced coverage while restraining an increase in cost.

SUMMARY

A mobile communication system according to this disclosure comprises a radio base station configured to manage a cell having a first coverage and a second coverage which is a portion enhanced more than the first coverage; a radio relay node configured to receive, from the radio base station, a plurality of data having different destination radio terminals from each other, and transmit the plurality of data simultaneously to a plurality of radio terminals in the second coverage; and a radio terminal configured to be located in the second coverage, receive one or a plurality of control signals transmitted from the radio base station or the radio relay node, and perform a process of receiving data addressed to own radio terminal from the radio relay node based on the one or the plurality of control signals.

A radio terminal according to this disclosure is in a mobile communication system. The mobile communication system includes: a radio base station configured to manage a cell having a first coverage and a second coverage which is a portion enhanced more than the first coverage; and a radio relay node configured to receive, from the radio base station, a plurality of data having different destination radio terminals from each other, and transmit the plurality data to a plurality of radio terminals in the second coverage. The radio terminal comprises: a controller configured to perform: a process of receiving one or a plurality of control signals transmitted from the radio base station or the radio relay node when the radio terminal is located in the second coverage; and a process of receiving data addressed to the radio terminal from the radio relay node based on the one or the plurality of control signals.

A method according to this disclosure comprises: managing, by a radio base station, a cell having a first coverage and a second coverage which is a portion enhanced more than the first coverage; receiving, by a radio relay node, from the radio base station, a plurality of data having different destination radio terminals from each other; transmitting, by the radio relay node, the plurality of data simultaneously to a plurality of radio terminals in the second coverage; receiving, by a radio terminal configured to be located in the second coverage, one or a plurality of control signals transmitted from the radio base station or the radio relay node; and performing, by the radio terminal, a process of receiving data addressed to own radio terminal from the radio relay node based on the one or the plurality of control signals.

BRIEF DESCRIPTION OF DRAWINGS

FIG. 8 is a diagram illustrating a modification of the operation of the mobile communication system according to the embodiment.

DESCRIPTION OF EMBODIMENTS

Figure 1:
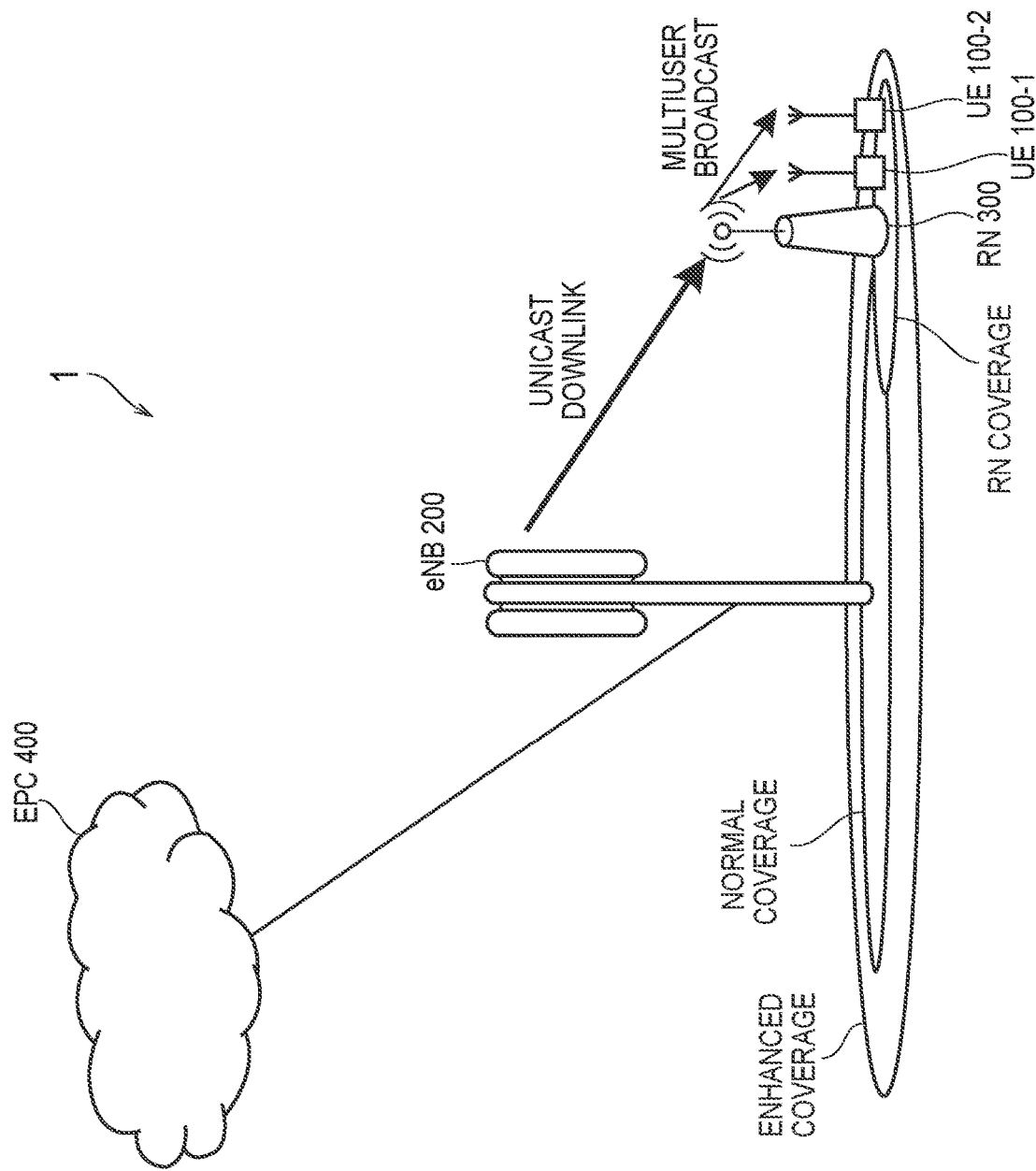
FIG. 1 is a diagram illustrating a configuration of a mobile communication system according to an embodiment.

Hereinafter, a mobile communication system according to an embodiment of the present invention will be described with reference to the accompanying drawings. Note that in the descriptions of the drawing below, identical or similar symbols are assigned to identical or similar portions.

1. A Configuration of a Mobile Communication System

A configuration of a mobile communication system according to the present embodiment will be described. The mobile communication system according to the present embodiment is a system of a long term evolution (LTE) system based on the 3GPP standard. However, the mobile communication system may a NR system which is 5G mobile communication system based on the 3GPP standard not limited to the LTE system.

FIG. 1 is a diagram illustrating a configuration of a mobile communication system according to an embodiment. As shown in the FIG. 1, the mobile communication system 1 according to the present embodiment includes a radio terminal (UE: user equipment) 100, a radio base station (eNB: evolved Node-B) 200, a radio relay node (RN: Relay node) 300, and a core network (EPC: evolved packet core) 400. Note that Although two UEs 100-1 and UE100-2 are illustrated in FIG. 1, the number of UEs 100 may be larger than 2.

The UE 100 is a mobile radio communication device that performs radio communication with the eNB 200. In the present embodiment, the UE 100 can communicate with the eNB 200 via the RN 300. The UE 100 may be any device as long as it is a device that performs radio communication with the eNB 200 or the RN 300. For example, the UE 100 is a mobile phone terminal, a tablet terminal, a notebook PC, a sensor, a device installed in the sensor, a vehicle, or a device installed in vehicle.

In the present embodiment, a UE 100 in a category targeting the MTC and IoT services. In particular, the UE 100 is a UE 100 whose transmission/reception bandwidth is limited to only a part of a system transmission/reception bandwidth (LTE transmission/reception bandwidth). The category is referred to as, for example, category M1 and category narrow band (NB)-IoT. The category M1 is a category to which an enhanced machine type communications (eMTC) UE belongs. The category NB-IoT (category NB1) is a category to which the NB-IoT UE belongs. The category M1 limits the transmission/reception bandwidth of the UE 100 (eMTC UE) to, for example, 1.08 MHz (that is, a bandwidth of 6 resource blocks). The category NB-IoT (category NB1) further limits the transmission/reception bandwidth of the UE 100 (NB-IoT UE) to 180 kHz (that is, a bandwidth of one resource block). By the narrowing of the bandwidth, it is possible to realize cost reduction and power consumption required for the eMTC UE and the NB-IoT UE.

Figure 2:
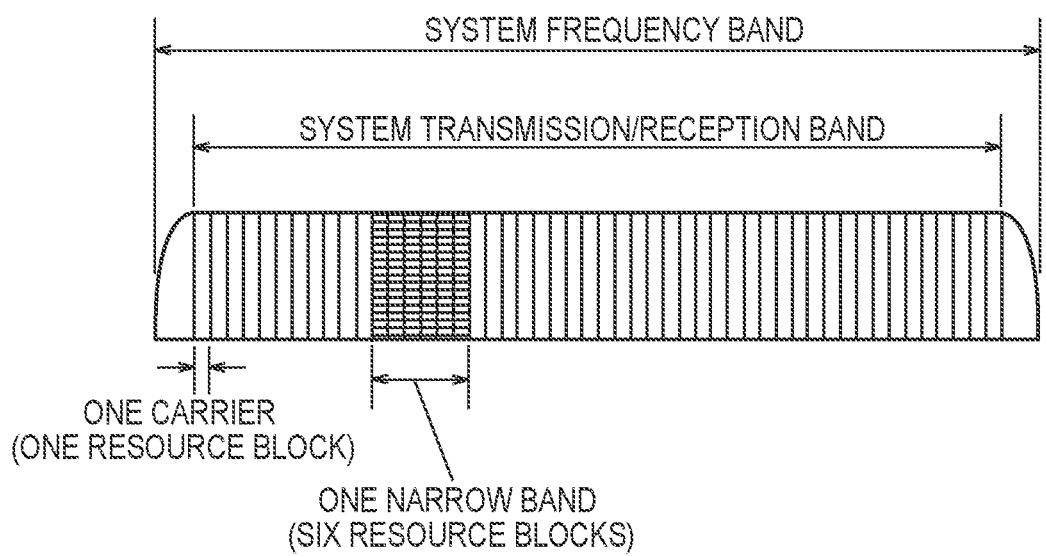
FIG. 2 is a diagram illustrating a frequency channel according to an embodiment.

FIG. 2 is a diagram illustrating a frequency channel handled by the UE 100 according to the present embodiment. As illustrated in FIG. 2, a frequency bandwidth of a system frequency band of the LTE system may be 10 MHz. The bandwidth of the system transmission/reception bandwidth is, for example, 50 resource blocks=9 MHz. The bandwidth of the frequency channel that is available by the eMTC UE is within 6 resource blocks=1.08 MHz. The frequency channel within 6 resource blocks that is available by the eMTC UE is referred to as a "narrow band (NB)". The bandwidth of the frequency channel that is available by the NB-IoT UE is 1 resource block=180 kHz. The frequency channel of 1 resource block that is available by the NB-IoT UE is referred to as a "carrier". The eMTC UE is operated within the LTE transmission/reception bandwidth. The NB-IoT UE supports a form operated within the LTE transmission/reception bandwidth, a form operated in a guard band outside the LTE transmission/reception bandwidth, and a form operated within the frequency band dedicated to the NB-IoT.

Also, the UE 100 supports an enhanced coverage (EC) function using repeated transmission or the like in order to realize coverage extension. Note that the enhanced coverage sometimes referred to as CE (Coverage Enhancement). The enhanced coverage function may include repetition that repeatedly transmits the same signal using a plurality of subframes. The coverage can be extended as the number of times of repetitions increases. The enhanced coverage function may include power boosting that increases a power density of the transmitted signal. As an example, the power density increases by narrowband transmission that narrows the frequency bandwidth of the transmitted signal. The coverage can be extended as the power density of the transmitted signal increases. The enhanced coverage function may include lower MCS transmission that lowers the MCS used for the transmitted signal. The coverage can be extended by performing transmission using MCS with a low data rate and high error tolerance.

As shown in FIG. 1, the UE 100 (the UE 100-1 and the UE 100-2) is in the enhanced coverage of the eNB 200. If first cell selection criteria (first S-criteria) for normal coverage are not satisfied and second cell selection criteria (second S-criteria) for enhanced coverage are satisfied, the UE 100 may determine that the UE 100 is in the enhanced coverage. The "UE in the enhanced coverage" means a UE that is required to use an enhanced coverage function (enhanced coverage mode) in order to access a cell.

The eNB 200 is a fixed communication device. The eNB 200 manages a cell and performs radio communication with the UE 100 which sets up the connection with a cell of the eNB 200. The eNB 200 has a radio resource management (RRM) function, a routing function of user data (hereinafter, sometimes referred to as "data"), a measurement control function for mobility control and scheduling, and the like. The "cell" is used as a term indicating a smallest unit of a radio communication area. Also, the "cell" may be sometimes used as a term indicating a function of performing the radio communication with the UE 100 or a resource. One cell belongs to one carrier frequency.

The eNB 200 is connected to the EPC 400. The EPC 20 includes mobility management entity (MME) and a serving gateway (S-GW) omitting the illustration. The MME performs various mobility controls and the like on the UE 100. The S-GW performs data transfer control. The MME and the S-GW are connected to the eNB 200 via an S1 interface.

The RN 300 is an apparatus (relay node) that intervenes in the communication between the eNB 200 and the UE 100 and relays the communication. The RN 300 is located within the normal coverage of the eNB 200. In the example of FIG. 1, the RN 300 is located at the end of the normal coverage of the eNB 200. The RN 300 manages the cell (RN coverage). The cell ID of the cell managed by the RN 300 may be the same as or different from the cell ID of the cell of the donor eNB 200. In the present embodiment, the description will proceed on the assumption that the cell ID of the cell managed by the RN 300 is different from the cell ID of the cell of the eNB 200.

The RN 300 may transmit (broadcast) a discovery signal for the UE 100 to discover the RN 300 for enhanced coverage. The discovery signal is a synchronization signal or a reference signal corresponding to the cell ID (PCI: Physical Cell Identifier) of the RN 300. The cell ID is identified by the combination of a primary synchronization signal (PSS) and a secondly synchronization signal (SSS) that compose the synchronization signal. Alternatively, the discovery signal may be a radio signal (beacon signal or the like) including the identifier of the RN 300.

The RN 300 receives a plurality of data having different destination UEs from the eNB 200. Downlink transmission from the eNB 200 to the RN 300 is performed by a unicast (unicast downlink). The RN 300 only processes the data received from the eNB 200 at the physical layer. Such an RN 300 is sometimes referred to as a layer 1 relay node (L1 RN). However, the RN 300 may further process the data received from the eNB 200 at the MAC layer or higher. The RN 300 transmits a plurality of data simultaneously to a plurality of UEs 100 in the enhanced coverage. Hereinafter, such a transmission simultaneously will be referred to as a multiuser broadcast. Note that the RN 300 may not only transmit a plurality of data simultaneously to a plurality of UEs 100 in enhanced coverage, but also transmit one or a plurality of data to one UE 100 in the enhanced coverage.

In the multiuser broadcast, the RN 300 retransmits the downlink signal received from the eNB 200 by the multiuser broadcast. The multiuser broadcast transmission includes data of a plurality of users. Each UE 100 receives the same transmission from the RN 300, but then decodes its own UE 100-specific data (UE-specific data).

In the multiuser broadcast transmission, the transport format (transport block size, modulation/coding method (MCS)) applied to the data of each UE 100 can be common. The multiuser broadcast does not use link adaptation (channel recognition scheduling) based on feedback from the UE 100. This reduces complexity and reduces the cost of both the RN 300 transmitter and the UE 100 receiver.

Resource allocation of UE-specific data in the multiuser broadcast can be based on frequency division multiplexing (FDM), time division multiplexing (TDM), spatial division multiplexing (SDM), or code division multiplexing (CDM). In the embodiment, the multiuser broadcast transmission from the RN 300 to the UE 100 is FDM-based (the UE data is allocated the orthogonal frequency resource).

However, the eMTC UE and the NB-IoT UE use a narrow band receiver. Thus, the UE 100 is allocated the frequency resource to monitor only specific part of the bandwidth to receive its own data. For example, the UE 100-1 is assigned to monitor the first 12 subcarriers and the UE 100-2 is assigned to monitor the next 12 subcarriers. Alternatively, the narrow band data may be hopping by frequency hopping using a UE-specific hopping pattern.

In this way, the RN 300 receives data of a plurality of UEs 100 located within the enhanced coverage from the eNB 200 and transmits the data of the plurality of UEs 100 simultaneously by the multiuser broadcast. As a result, each UE 100 located in the enhanced coverage can receive the data in a good reception state, so that the reachability of the data from the eNB 200 to the UE 100 can be improved. In addition, the multiuser broadcast does not require complicated communication control between the RN 300 and the UE 100, so that it can be realized at low cost.

2. Configurations of Each of Devices

The configurations of the UE 100, the eNB 200, and the RN 300 according to the present embodiment will be described.

Figure 3:
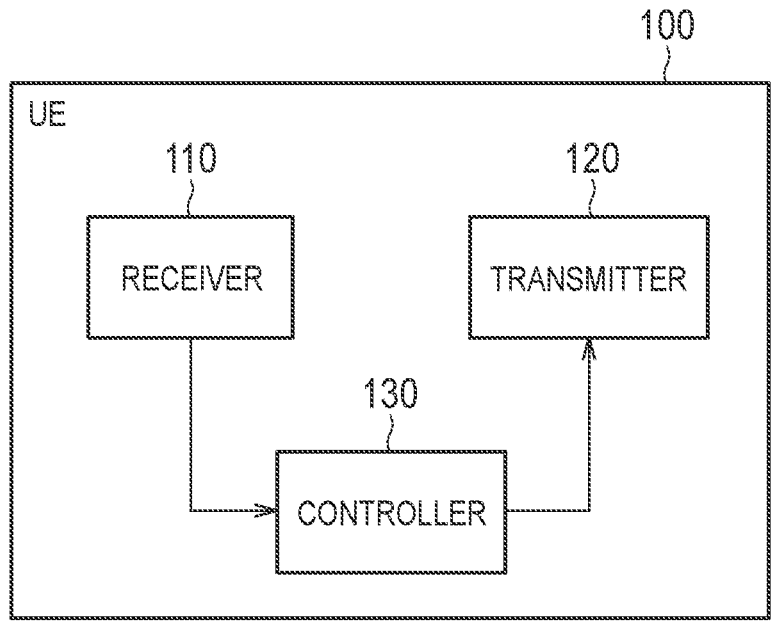
FIG. 3 is a diagram illustrating a configuration of a UE (radio terminal) according to an embodiment.

FIG. 3 is a diagram illustrating a configuration of the UE 100 (radio terminal). As shown in FIG. 3, the UE 100 includes a receiver 110, a transmitter 120, and a controller 130.

The receiver 110 performs various receptions under the control of the controller 130. The receiver 110 includes an antenna and a receiving device. The receiving device converts a radio signal received by the antenna into a baseband signal (received signal) and outputs the baseband signal to the controller 130. The transmitter 120 performs a variety of transmission under the control of the controller 130. The transmitter 120 includes an antenna and a transmitting device. The transmitting device converts the baseband signal (transmitted signal) output from the controller 130 into the radio signal and transmits the radio signal from the antenna.

The controller 130 performs various controls in the UE 100. The controller 130 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

Figure 4:
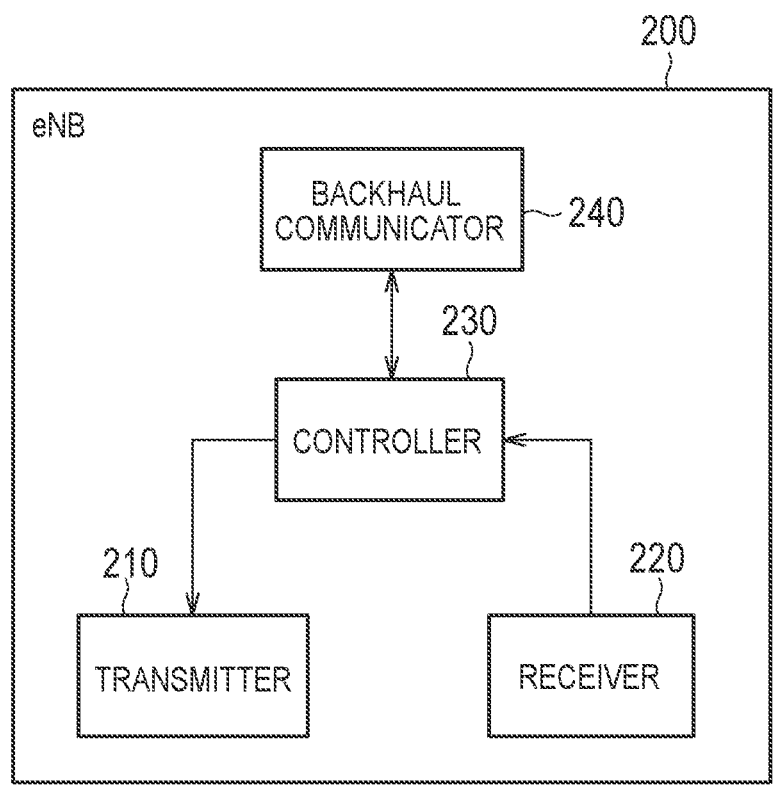
FIG. 4 is a diagram illustrating a configuration of an eNB (radio base station) according to an embodiment.

FIG. 4 is a diagram illustrating a configuration of the eNB 200 (radio base station). As shown FIG. 4, the eNB 200 includes a transmitter 210, a receiver 220, a controller 230, and a backhaul communicator 240.

The transmitter 210 performs a variety of transmission under the control of the controller 230. The transmitter 210 includes an antenna and a transmitting device. The transmitting device converts a baseband signal (transmitted signal) output from the controller 230 into a radio signal and transmits the radio signal from the antenna. The receiver 220 performs a variety of reception under the control of the controller 230. The receiver 220 includes an antenna and a receiving device. The receiving device converts the radio signal received by the antenna into the baseband signal (received signal) and outputs the baseband signal to the controller 230.

The controller 230 performs various controls in the eNB 200. The controller 230 includes at least one processor and memory. The memory stores a program executed by the processor and information used for processing by the processor. The processor may include a baseband processor and a CPU. The baseband processor performs modulation/demodulation, encoding/decoding, and the like of the baseband signal. The CPU performs a variety of processing by executing programs stored in the memory. The processor executes processing to be described later.

The backhaul communicator 240 is connected to an adjacent eNB via an X2 interface. The backhaul communicator 240 is connected to an MME/S-GW 300 via an S1 interface. The backhaul communicator 240 is used for communication performed on the X2 interface, communication performed on the S1 interface, and the like.

Figure 5:
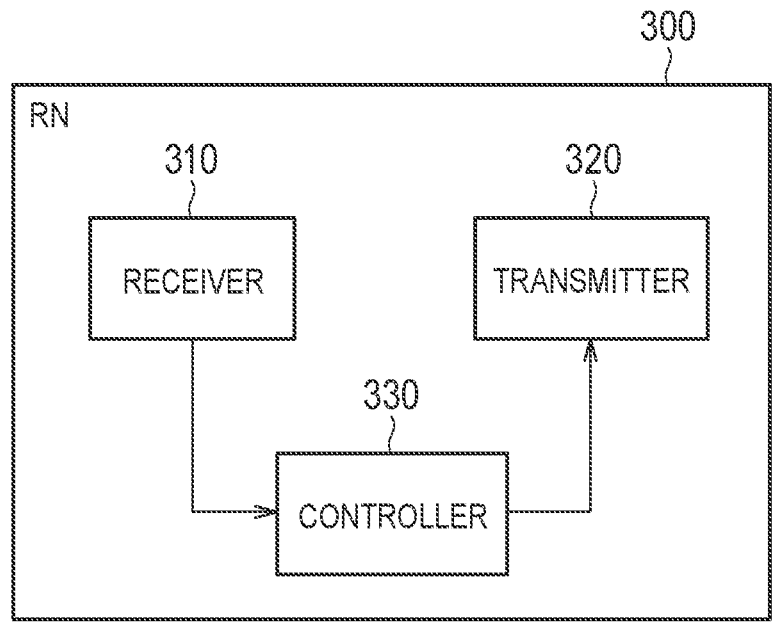
FIG. 5 is a diagram illustrating a configuration of an RN (radio relay node) according to the embodiment.

FIG. 5 is a diagram illustrating a configuration of the RN 300 (radio relay node). As shown in FIG. 5, the RN 300 includes a receiver 310, a transmitter 320, and a controller 330.

The receiver 310 performs various receptions under the control of the controller 330. The receiver 310 includes an antenna and a receiving device. The receiving device converts a radio signal received by the antenna into a baseband signal (received signal) and outputs the baseband signal to the controller 330. The transmitter 320 performs a variety of transmission under the control of the controller 330. The transmitter 320 includes an antenna and a transmitting device. The transmitting device converts the baseband signal (transmitted signal) output from the controller 330 into the radio signal and transmits the radio signal from the antenna.

The controller 330 performs various controls in the RN 300. The controller 330 includes at least one processor and memory. The memory stores a program executed by the processor and information used for processing by the processor. The processor may include a baseband processor and a central processing unit (CPU). The baseband processor performs modulation/demodulation, encoding/decoding, and the like of the baseband signal. The CPU performs a variety of processing by executing programs stored in the memory. The processor executes processing to be described later.

3. An Example of a Protocol Stack

An example of a protocol stack according to the present embodiment will be described.

Figure 6:
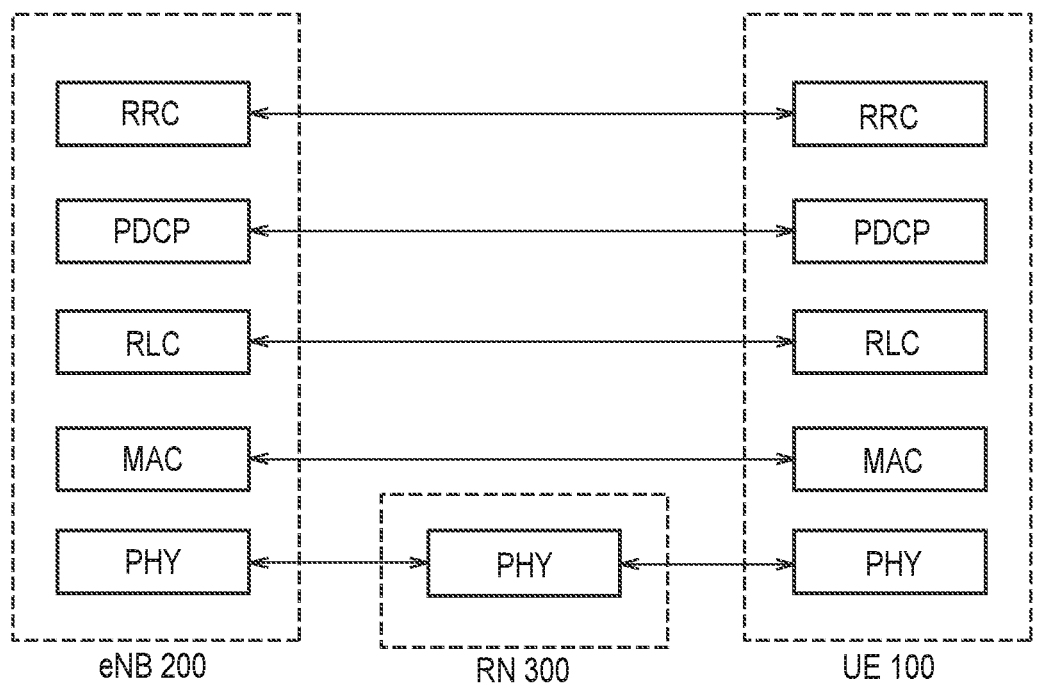
FIG. 6 is a diagram illustrating an example of a protocol stack according to an embodiment.

FIG. 6 is a diagram illustrating a configuration of a protocol stack of a radio interface in the radio communication system 1. In particular, FIG. 6 illustrates a protocol stack at the time of relay transmission.

As illustrated in FIG. 6, a radio interface protocol is divided into a first layer to a third layer of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs encoding/decoding, modulation/demodulation, antenna mapping/demapping, and resource mapping/demapping. Data and control signal are transmitted between the PHY layer of the UE 100 and the PHY layer of the RN 300 via a physical channel. Similarly, data and control signal are transmitted between the PHY layer of the RN 300 and the PHY layer of the eNB 200 via a physical channel.

The MAC layer performs priority control of data, retransmission processing by hybrid ARQ (HARQ), and the like. The data and control signal are transmitted between the MAC layer of the UE 100 and the MAC layer of the eNB 200 via a transport channel. The MAC layer of the eNB 200 includes a scheduler. The scheduler determines uplink and downlink transport formats (transport block size, MCS) and a resource block allocated to the UE 100.

The RLC layer transmits data to an RLC layer on a receiving side using the functions of the MAC layer and the PHY layer. The data and control signal are transmitted between the RLC layer of the UE 100 and the RLC layer of the eNB 200 via a logical channel.

The PDCP layer performs header compression/expansion and encryption/decryption.

The RRC layer is defined only in a control plane that handles the control signal. The RRC signaling for various configurations is transmitted between the RRC layer of the UE 100 and the RRC layer of the eNB 200. The RRC layer controls logical channels, transport channels, and physical channels in response to establishment, re-establishment, and release of a radio bearer. When there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode.

In FIG. 6, the RN 300 is connected to the UE 100 and the eNB 200 via the PHY layer, and is not connected to them via the other layers. That is, the RN 300 processes the data relayed between the UE 100 and the eNB 200 only in the PHY layer, and does not process it in the other layers (MAC layer, etc.).

Further, the RN 300 may have only the PHY layer, or may have other upper layers (the MAC layer, the RLC layer, the PDCP layer, and the RRC layer). However, even when the RN 300 has an upper layer, it is not connected to the UE 100 and the eNB 200 in the upper layer.

4. Operation of Mobile Communication System

The operation of a mobile communication system 1 according to the present embodiment will be described. As mentioned above, although the multiuser broadcast is feasible at low cost, there is only a physical channel between the UE 100 and the RN 300, and it is difficult for the RN 300 to properly perform control for the UE 100 to start and/or end data reception from the RN 300.

Therefore, in the present embodiment, the eNB 200 controls the UE 100 regarding the multiuser broadcast. Specifically, the eNB 200 transmits a control signal related to the multiuser broadcast directly to the UE 100 (without through the RN 300). Based on such a control signal, the UE 100 performs a process for receiving data transmitted by the multiuser broadcast from the RN 300.

In the embodiment, an example will be described in which the control signal transmitted from the eNB 200 to the UE 100 is the signaling (that is, RRC signaling) defined in the RRC layer specification. The RRC signaling may be a system information block (SIB) transmitted by the broadcast or an RRC reconfiguration message transmitted by the unicast. Alternatively, the control signal may be a paging message.

Figure 7:
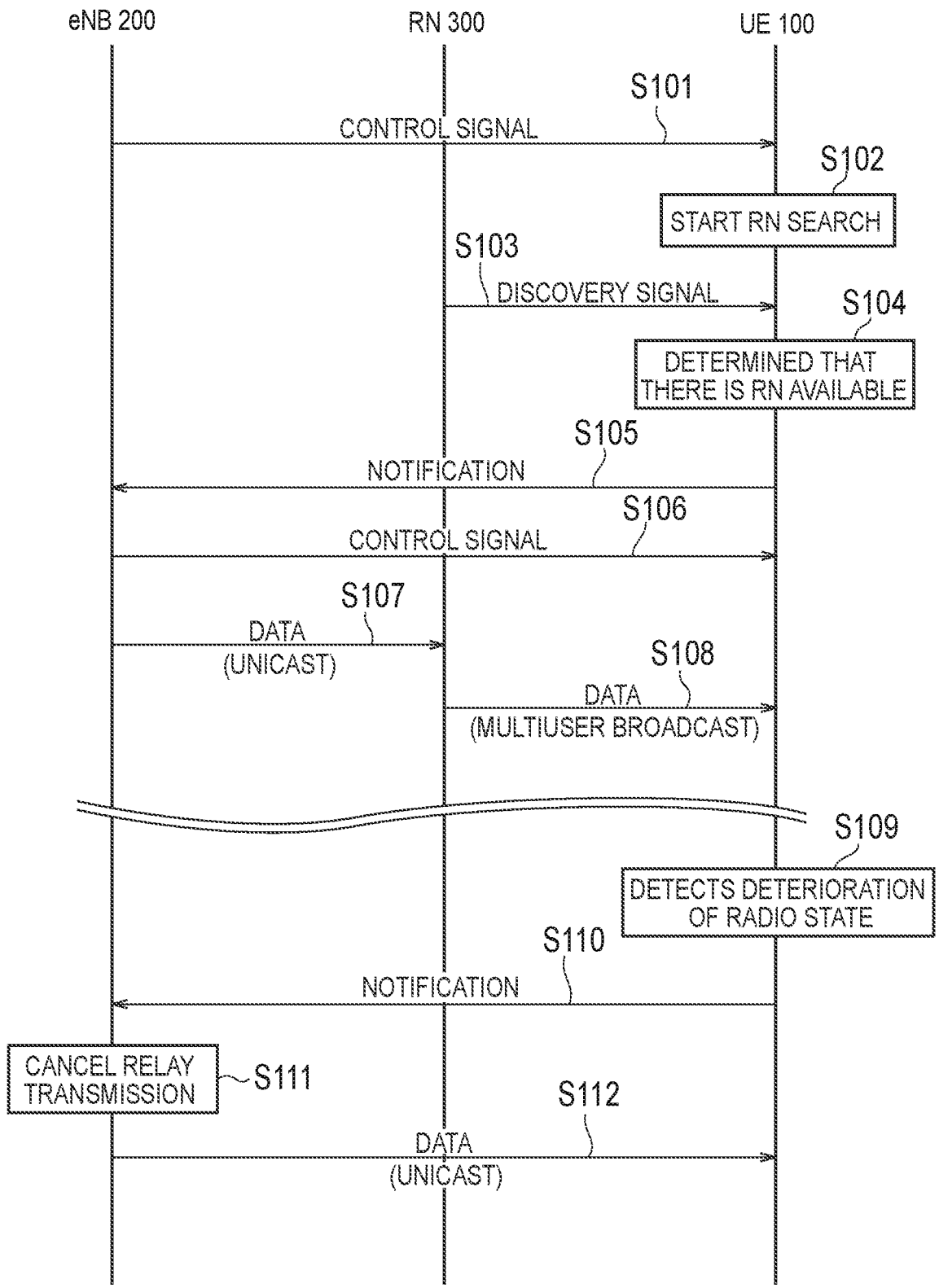
FIG. 7 is a diagram illustrating the operation of the mobile communication system according to the embodiment.

FIG. 7 is a diagram illustrating the operation of the mobile communication system 1 according to the present embodiment. In FIG. 7, the UE 100 is located within the enhanced coverage of the eNB 200. The UE 100 may be in the RRC connected mode or in the RRC idle mode. When the UE 100 is in the RRC idle mode, the SIB may be received as a control signal from the eNB 200.

As illustrated in FIG. 7, in step S101, the eNB 200 transmits a control signal used for the UE 100 to discover (search for) the RN 300 to the UE 100. The transmission referred to here may mean a broadcast. Further, the eNB 200 may transmit a control signal periodically (cyclically) or irregularly. The control signal may include an identifier for the RN 300. The identifier for the RN 300 may be a cell ID or an identifier different from the cell ID. The control signal may include resource information indicating a radio resource (time/frequency resource) used for the RN 300 to transmit the discovery signal. Alternatively, the control signal may include information to simply instruct the UE 100 to start the search for the RN 300. The UE 100 receives a control signal from the eNB 200. Further, the control signal may include a condition for the UE 100 to start to discover (search for) the RN 300. The condition includes, for example, the reception strength of the signal transmitted from the eNB 200 to which the UE 100 belongs being equal to or less than a predetermined threshold value. Note that this condition may be the same as the condition that it is determined that the UE 100 is within the enhanced coverage of the eNB 200. The control signal may also include the condition of the RN 300 that the UE 100 determines in step S104 that there is the RN 300 available. The condition may include the threshold value in order to, for example, determine that the RN 300 whose reception signal strength of the discovery signal transmitted from the RN 300 is equal to or greater than a predetermined threshold value is available.

In step S102, the UE 100 starts to search for RN 300. Specifically, when the UE 100 determines, based on the control signal received from eNB 200 in step S101, that the UE 100 is in the enhanced coverage of the eNB 200 (or the reception signal strength of the signal from the eNB 200 is equal to or less than a predetermined threshold value), the UE 100 starts to search for the discovery signal transmitted by the RN 300. The UE 100 may search for a discovery signal including the identifier based on the identifier related to the RN 300 included in the control signal. The UE 100 may perform, based on the resource information included in the control signal, the search by monitoring the radio resources (time/frequency resources) used for the RN 300 to transmit the discovery signal. Further, when the conditions are met when the control signal received in step S101 includes a start condition, the UE 100 may start to search for the discovery signal transmitted by the RN 300.

In step S103, the UE 100 detects (discovers) the discovery signal transmitted by the RN 300.

In step S104, the UE 100 determines, based on the discovery signal from the RN 300, that there is an RN 300 available to the UE 100. Alternatively, the UE 100 may store the position information when the RN 300 was discovered in the past, and may determine, by performing an autonomous search based on the stored position information and the current position information, that there is the RN 300 available to the UE 100. Such position information may be an RF fingerprint illustrating the reception status from a plurality of cells, or may be detailed position information obtained by the GNSS receiver of the UE 100. In step S104, when the control signal received in step S101 includes the condition of the RN 300 that it is determined that there is the RN 300 available to the UE 100, the UE 100 may determine, based on the condition, the RN 300 available to the UE 100. Specifically, when, for example, the UE 100 receives discovery signals from a plurality of RNs 300, the UE 100 may determine the RN 300 that satisfies the condition of the plurality of discovery signals is the RN 300 that is available to the UE 100.

Alternatively, instead of determining the RN 300 available to the UE 100, it may determine the RN 300 available to the eNB 200. In this case, step S104 may be omitted, and, in step S105, instead of notifying the eNB 200 that the relay transmission using the RN 300 is possible, the UE 100 may transmit the measurement result of the discovery signal received from the RN 300 or the identifier of the RN 300 corresponding to the received discovery signal. In this case, the eNB 200 may determine, based on the measurement result received from the UE 100, the RN 300 available to the UE 100.

In step S105, the UE 100 notifies the eNB 200 that relay transmission using the RN 300 is possible. This notification can also be considered to register, in the eNB 200, the coverage of the RN 300 or the RN 300 to which the UE 100 belongs. Alternatively, this notification can be regarded as a request to start relay transmission. The UE 100 may make such a notification by transmitting to the eNB 200 a measurement report including an identifier included in the discovery signal from the RN 300. When the UE 100 receives discovery signals from a plurality of RNs 300, the measurement report may include a plurality of identifiers corresponding to the plurality of RNs 300. Alternatively, the measurement report may include only the identifier of the RN 300 having the highest reception power of the discovery signal. The measurement report is a kind of RRC signaling. The UE 100 may make such notification by the RRC signaling other than the measurement report. Alternatively, the UE 100 may transmit a notification to the eNB 200 via the RN 300. For example, the UE 100 may transmit a notification to the RN 300 through a physical channel, and the RN 300 may relay the notification to the eNB 200. The eNB 200 determines, based on the notification from the UE 100, that the relay transmission to the UE 100 is started. The eNB 200 may determine that the relay transmission to the UE 100 is started when receiving the data addressed to the UE 100 from the EPC 400 after receiving the notification from the UE 100.

In step S106, the eNB 200 transmits a control signal indicating the start of the relay transmission to the UE 100. The eNB 200 may transmit the control signal to the UE 100 via the RN 300, or may directly transmit the control signal to the UE 100. The control signal may include resource information indicating a radio resource (time/frequency resource) used for the RN 300 to perform the multiuser broadcast. Specifically, such resource information may be information (for example, a resource block number) indicating the resource (time/frequency resource) of the physical downlink control channel used for the multiuser broadcast. Such resource information may include information indicating the number of repetitive transmissions (reception number) or the maximum number of repetitive transmissions (maximum reception number) of the physical downlink control channel used for the multiuser broadcast. Such a physical downlink control channel may be an MTC physical downlink control channel (MPDCCH) having a bandwidth of 6 resource blocks or less, or may be a narrowband physical downlink control channel (NPDCCH) consisting of a bandwidth of one resource block. The UE 100 starts to monitor the physical downlink control channel used for the multiuser broadcast based on the resource information included in the control signal.

In step S107, the eNB 200 transmits the data addressed to the UE 100 to the RN 300 by the unicast. The eNB 200 may associate each identifier of the plurality of UEs with the UE-specific data, of the identifier, addressed to the UE to transmit the data addressed to the UE 100 to the RN 300. When the eNB 200 notifies the UE 100 of resource information indicating the radio resource used for the multiuser broadcast in step S106, the eNB 200 may notify the RN 300 of the resource information after step S107, step S106, or before step S108. Then, the RN 300 may perform a multiuser broadcast using the resource indicated in the resource information received from the eNB 200.

In step S108, the RN 300 transmits (transfers) the data received from the eNB 200 by the multiuser broadcast. Specifically, first, the RN 300 allocates a frequency resource for data transmission to each UE 100 as the transmission destination of the multiuser broadcast before transmitting the data, and notifies each UE 100 of the allocated frequency resource, MCS information, etc. through the physical downlink control channel. Note that the resource allocation here means the resource allocation in the PHY layer, and does not have to mean the resource allocation in the MAC layer. In step S106 when the eNB 200 transmits, to the UE 100, resource information indicating the radio resources used for the RN 300 to perform the multiuser broadcast, the allocation of the frequency resource and the notification of the frequency resource and the like may be omitted here. Here, the frequency resource for data transmission may be a physical downlink shared channel (PDSCH) resource, or may be a narrowband downlink shared channel (NDSCH) resource. Then, the RN 300 transmits data simultaneously to each UE 100 using the frequency resource allocated to each UE 100. The UE 100 receives and decodes the data addressed to itself included in the frequency resource notified through the physical downlink control channel.

After discovering the RN 300, the UE 100 transmits information about the radio state (for example, reference signal reception power) between the RN 300 and the UE 100 to the eNB 200. The UE 100 may transmit such information to the eNB 200 with the information included in the measurement report. The UE 100 may make identification information about the RN 300 included in the measurement configuration. The measurement configuration, which is the configuration related to the measurement report, may be configured to the UE 100 in step S101, may be configured to the UE 100 in step S106, or may be configured to the UE 100 via the RN 300 in steps S107 and S108.

Then, in step S109, the UE 100 detects the deterioration of the radio state between the RN 300 and the UE 100. For example, the UE 100 may determine that the radio state has deteriorated when the discovery signal or data transmitted from the RN 300 cannot be normally received. The UE 100 may determine that the radio state has deteriorated when the reception power of the discovery signal (particularly, the reference signal) from the RN 300 falls below the threshold value. The threshold value may be configured by the measurement configuration described above.

In step S110, the UE 100 notifies the eNB 200 of information indicating the deterioration of the radio state in response to detecting deterioration of the radio state between the RN 300 and the UE 100. This notification can also be regarded as unregistering the RN 300. Alternatively, this notification can be regarded as a request to cancel the relay transmission. The UE 100 may make such notification by transmitting to the eNB 200 a measurement report including an identifier for the RN 300. The UE 100 may transmit such a notification to the eNB 200 via the RN 300 or to the eNB 200 without through the RN 300. In addition, instead of executing steps S109 and 110, the UE 100 may measure the radio state between the RN 300 and the UE 100 periodically or according to the measurement condition (measurement cycle, etc.) configured by the eNB 200 and may transmit a measurement report including the measurement result to the eNB 200. In this case, in step S111, the eNB 200 may determine, based on the measurement report received from the UE 100, whether to continue the relay transmission. When determining that the relay transmission is cancelled, the eNB 200 notifies the UE 100 that step S112 will be performed or the relay transmission will be cancelled. On the other hand, when determining that the relay transmission is continued, it continues the relay transmission.

In step S111, the eNB 200 determines, based on the notification from the UE 100, that the relay transmission to the UE 100 is cancelled. Alternatively, the eNB 200 may continue the relay transmission to the UE 100 by changing the RN 300 that relays communication with the UE 100 to another RN 300 based on the notification (measurement report) from UE 100. Specifically, when the measurement result of the radio state related to another RN 300 is included in the notification (measurement report) from the UE 100, the eNB 200 selects the other RN 300 with the best radio state as a new relay destination, and starts the relay transmission with the other RN 300 as the new relay destination.

In step S112, the eNB 200 switches from the relay transmission through the RN 300 to the direct transmission without through the RN 300 to transmit data addressed to the UE 100 by the unicast. When necessary, the UE 100 performs a process (RRC reconfiguration, RRC connection procedure, etc.) necessary for data communication with the eNB 200.

5. Another Embodiment

FIG. 8 is a diagram illustrating a modification of the operation of the mobile communication system 1. In this modification, the operation until the relay transmission (multiuser broadcast) is started is different from that in the above-described embodiment.

As illustrated in FIG. 8, in step S201, the eNB 200 transmits to the UE 100 a control signal including information for causing the UE 100 to transmit a discovery signal. The information for causing the UE 100 to transmit the discovery signal may include a resource, a cycle, and a condition as a trigger that are used for the UE 100 to transmit the discovery signal. The discovery signal transmitted by the UE 100 may be a random access preamble transmitted on a physical random access channel, may be a sounding reference signal, or may be a discovery signal defined by the specifications of the side link, which is a direct link between the UEs.

In step S202, the UE 100 transmits the discovery signal in response to the control signal from the eNB 200. The RN 300 receives the discovery signal from the UE 100. The discovery signal may include the identifier (IMSI) of the UE 100.

The UE 100 may transmit to the RN 300 the discovery signal by the unicast or by the broadcasting.

The UE 100 may use the resource included in the control signal received by the UE 100 in step S201 to transmit the discovery signal. The control signal in step S201 may be received by the RN 300. In this way, the RN 300 can grasp which resource the UE 100 uses to transmit the discovery signal, and can receive the discovery signal from the UE 100.

In addition, when the control signal received from the eNB 200 in step S201 includes a condition as a trigger of the transmission of the discovery signal, the UE 100 may transmit the discovery signal in response to satisfying the condition as the trigger. The condition may be the same as the condition that it is determined that the UE 100 is located in the enhanced coverage of the eNB 200. Specifically, the UE 100 may determine that the condition as a trigger when the reception status (reception signal strength, etc.) of the signal from the eNB 200 is smaller than a predetermined threshold value is satisfied, and may transmit the discovery signal.

In addition, the UE 100 may transmit a discovery signal as a trigger when the signal broadcast by the RN 300 is received. In this case, the transmission destination of the discovery signal may be the RN 300.

In step S203, the RN 300 transmits to the eNB 200 a notification about the discovery signal received from the UE 100. The notification may be the same as the discovery signal received by the RN 300 in step S202. The notification may also include the UE 100 identifier included in the discovery signal received by the RN 300 in step S202. Based on such notification, the eNB 200 determines that the relay transmission to the UE 100 is started. The eNB 200 may determine that the relay transmission to the UE 100 is started when receiving the data addressed to the UE 100 from the EPC 400 after receiving the notification from the UE 100. Subsequent operations are the same as those in the above-described embodiment (steps S106 to 108 in FIG. 7). Further, the RN 300 may transmit to the eNB 200 the measurement result of the discovery signal received in step S202 instead of step S203. The measurement result may include the reception signal strength of the discovery signal and the like. In this case, the eNB 200 may determine, based on the measurement result received from the RN 300, whether to start the relay transmission to the UE 100.

The above-described embodiment mainly relates to downlink transmission from the eNB 200 to the UE 100, but the above embodiment may also be applied to the uplink transmission from the UE 100 to the eNB 200.

A program for causing a computer to execute each processing described the above. In addition, the program may be recorded on a computer-readable medium. If a computer-readable medium is used, a program can be installed in the computer. Here, the computer-readable medium on which the program is recorded may be a non-transitory recording medium. The non-transitory recording medium is not particularly limited, but may be a recording medium such as a CD-ROM or a DVD-ROM. A chip set including a memory that stores a program for executing each processing described the above and a processor that executes the program stored in the memory may be provided.

An embodiment of this invention has been described in detail above with reference made to the drawings, however, the specific structure thereof is not limited to this and various design modifications and the like are possible insofar as they do not depart from the spirit or scope.

INDUSTRIAL APPLICABILITY

The embodiment described the above is useful in the communication field.

The invention claimed is:

1. A mobile communication system comprising:
    a radio base station configured to manage a cell having a first coverage and a second coverage which is a portion enhanced more than the first coverage;
    a radio relay node configured to receive, from the radio base station, a plurality of data having different destination radio terminals from each other, and transmit the plurality of data simultaneously to a plurality of radio terminals in the second coverage; and
    a radio terminal configured to be located in the second coverage, receive one or a plurality of control signals transmitted from the radio base station or the radio relay node, and perform a process of receiving data addressed to own radio terminal from the radio relay node based on the one or the plurality of control signals.

2. The mobile communication system according to claim 1, wherein
    the radio terminal is configured to receive the one or the plurality of control signals from the radio base station without through the radio relay node.

3. The mobile communication system according to claim 1, wherein
    the one or the plurality of control signals includes resource information related to a radio resource used for the radio relay node to transmit data simultaneously.

4. The mobile communication system according to claim 2, wherein
    the radio terminal is configured to search for a discovery signal transmitted by the radio relay node based on the one or the plurality of control signals.

5. The mobile communication system according to claim 4, wherein
    the one or the plurality of control signals includes an identifier for the radio relay node, wherein
    the radio relay node is configured to transmit the discovery signal including the identifier, and
    the radio terminal is configured to perform the search based on the identifier included in the one or the plurality of control signals.

6. The mobile communication system according to claim 4, wherein
    the one or the plurality of control signals includes resource information related to a radio resource used for the radio relay node to transmit the discovery signal, wherein
    the radio relay node is configured to use the radio resource to transmit the discovery signal, and
    the radio terminal is configured to perform the search based on the resource information included in the one or the plurality of control signals.

7. The mobile communication system according to claim 4, wherein
    the radio terminal is configured to transmit, to the radio base station, a notification related to the radio relay node when determining to have discovered the radio relay node by the search.

8. The mobile communication system according to claim 1, wherein
    the radio terminal is configured to transmit, to the radio base station, information related to a radio state between the radio relay node and the radio terminal after discovering the radio relay node.

9. The mobile communication system according to claim 8, wherein
    the radio terminal is configured to transmit, to the radio base station, information indicating deterioration of the radio state in response to detecting deterioration of the radio state.

10. The mobile communication system according to claim 8, wherein
    the radio base station to switch from a relay transmission through the radio relay node to a direct transmission without through the radio relay node in response to deterioration of the radio state and to transmit data addressed to the radio terminal.

11. The mobile communication system according to claim 2, wherein
    the one or the plurality of control signals includes information for causing the radio terminal to transmit a discovery signal, wherein
    the radio terminal is configured to transmit the discovery signal in response to a reception of the one or the plurality of control signals, and
    the radio relay node is configured to perform a notification to the radio base station when receiving the discovery signal from the radio terminal.

12. A radio terminal in a mobile communication system, the mobile communication system comprising: a radio base station configured to manage a cell having a first coverage and a second coverage which is a portion enhanced more than the first coverage; and a radio relay node configured to receive, from the radio base station, a plurality of data having different destination radio terminals from each other, and transmit the plurality data to a plurality of radio terminals in the second coverage, the radio terminal comprising:
    a controller configured to perform: a process of receiving one or a plurality of control signals transmitted from the radio base station or the radio relay node when the radio terminal is located in the second coverage; and a process of receiving data addressed to the radio terminal from the radio relay node based on the one or the plurality of control signals.

13. A method comprising:
    managing, by a radio base station, a cell having a first coverage and a second coverage which is a portion enhanced more than the first coverage;
    receiving, by a radio relay node, from the radio base station, a plurality of data having different destination radio terminals from each other;
    transmitting, by the radio relay node, the plurality of data simultaneously to a plurality of radio terminals in the second coverage;
    receiving, by a radio terminal configured to be located in the second coverage, one or a plurality of control signals transmitted from the radio base station or the radio relay node; and performing, by the radio terminal, a process of receiving data addressed to own radio terminal from the radio relay node based on the one or the plurality of control signals.

\* \* \* \* \*